UNITED STATES PATENT OFFICE.

JOHN R. MESSERSMITH, OF CINCINNATI, OHIO.

PROCESS OF CASE-HARDENING IRON AND STEEL.

1,260,787. Specification of Letters Patent. Patented Mar. 26, 1918.

No Drawing. Application filed July 19, 1916. Serial No. 110,216.

*To all whom it may concern:*

Be it known that I, JOHN R. MESSERSMITH, a citizen of the United States of America, and a resident of Cincinnati, in the county of Hamilton and State of Ohio, have invented a certain new and useful Improvement in Processes of Case-Hardening Iron or Steel, of which the following is a specification.

This invention relates to the process of case-hardening metals and, more especially, such metals as iron or steel used in the manufacture of machine elements, and its object is to render the process more certain, as well as more economical, and to retain the desired percentage of carbon in the machined or otherwise finished product itself as well as to avoid oxidation therein. Besides, the process herein is productive of a metal that is freer from phosphorus and the other injurious substances now and heretofore known in connection with present and past processes of more or less case-hardening.

In effecting the process herein, I employ a compound or composition of the following ingredients or elements in about the following proportions—viz., one (1) pint, by measure, of yellow prussiate of potash, one (1) pint, by measure, of common salt, and one-half ($\frac{1}{2}$) pint, by measure, of rosin. These ingredients or elements are all pulverized or powdered and thoroughly mixed, a small amount or layer of the mixture being packed or placed in contact with the metal that is to be treated in a box or receptacle containing oak sawdust, or some substance such as charcoal, coke or earth, the sawdust being preferable, and then said box, with its said contents, is placed in an enveloping fire in a furnace, as customary, where it is subjected to a heat of from sixteen hundred (1600) to seventeen hundred (1700) degrees Fahrenheit, being allowed to remain in such heat from four to twelve or even more hours, to suit the depth to which the hardening is desired. The box is then withdrawn from the furnace and its contents removed and plunged or immersed in cold water, at from fourteen hundred (1400) to fifteen hundred (1500) degrees Fahrenheit, after which, when thoroughly cool, the said contents are again heated to from fourteen hundred (1400) to fourteen hundred and fifty (1450) degrees Fahrenheit and then again withdrawn from the furnace for immersion in water for a hard surface, or in oil for a softer and tougher case.

The product and more especially the machined or otherwise finished product resulting from this process, in which my said compound is used in the said preferred proportions, is a very hard one, of any depth needed or desired, and at the same time the center or core of the metal is left in its natural, soft and tough state, the latter preventing brittleness in the core.

Processes heretofore used have not been free from phosphorus and other injurious substances that are a detriment to the machined or otherwise finished metal and have been somewhat difficult to carry into effect, as well as very expensive.

I claim:—

The herein-described process for case-hardening iron or steel so that it shall retain the desired percentage of carbon and to avoid oxidation in the machined or otherwise finished product, and, also, so that its center or core shall remain in its natural soft and tough state, such process consisting in subjecting the metal to a relatively proportioned and mixed cementation of pulverized yellow prussiate of potash one pint, common salt one pint, and rosin one-half pint, each ingredient by measure, and packed within a receptacle wherein the whole content is subjected to heating and re-heating temperatures substantially as set forth.

JOHN MESSERSMITH.